Jan. 6, 1925.

F. OLSON ET AL

SPEEDOMETER ATTACHMENT

Filed April 29, 1924

1,521,966

Inventors
Frank Olson
Harold Brewer.

By

Attorney

Patented Jan. 6, 1925.

1,521,966

UNITED STATES PATENT OFFICE.

FRANK OLSON AND HAROLD BREWER, OF WINDSOR, COLORADO.

SPEEDOMETER ATTACHMENT.

Application filed April 29, 1924. Serial No. 709,847.

*To all whom it may concern:*

Be it known that we, FRANK OLSON and HAROLD BREWER, citizens of the United States, residing at Windsor, county of Weld, and State of Colorado, have invented certain new and useful Improvements in Speedometer Attachments; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for attaching a speedomoter to an automobile.

Speedometers are quite universally employed in connection with automobiles. In the large majority of cases, however, the factory has made no special provision for connecting this instrument to the car, with the result that the speedometers have been in the form of attachments and this has made it necessary for the manufacturers of speedometers to provide some means whereby this instrument can be attached to the ordinary car. The means most usually employed is an annular gear that is attached to one of the front wheels. A pinion meshes with this gear and is connected by means of a flexible shaft with the speedometer. This arrangement, although it serves its purpose fairly well, is objectionable for several reasons. In the first place it requires the front wheel to be removed, which involves considerable labor, in the second place, it mars the appearance of the car, and, in the third place, the gears are exposed to dirt and dust and therefore wear very rapidly.

It is the object of this invention to provide means whereby the speedometer may be connected to the car mechanism at or near the universal. By this means the appearance of the car will not be altered, the gears will be protected from dust and dirt, and the labor of installation will be decreased.

In order better and more clearly to describe our invention, we shall have reference to the accompanying drawing in which our invention is illustrated, and in which.

Figure 1:
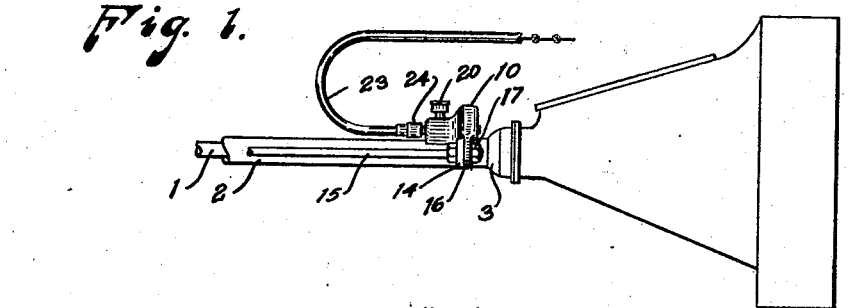
Fig. 1 is a side elevation of a portion of an automobile showing our attachment in place thereon.
Figure 2:
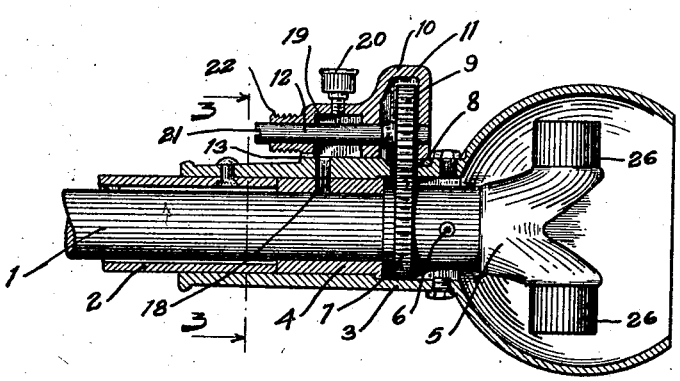
Fig. 2 is a section taken on line 2—2, Fig. 3.

In the drawing numeral 1 designates the drive-shaft and 2 the drive-shaft tubing. Secured to the end of the drive-shaft tubing is the universal joint housing 3. The end of the shaft 1 is journaled in the bearing 4 and has connected to it the joint knuckle 5. This knuckle is held in place on the shaft by means of a rivet 6 and differs from the ordinary joint knuckle used in cars of this type by having a gear 7 formed integral therewith. The universal joint housing 3 has a small opening 8 cut in the upper wall thereof for the purpose of permitting the gear 9 to be operatively connected to the gear 7. For the purpose of supporting the gear 9 I have provided a housing 10 that has a chamber 11 near one end. A shaft 12 is journaled in the walls of housing 10 and carries the gear 9, which is non-rotatably secured thereto. The housing 10 is shaped in such a manner that its lower side conforms to the shape of the universal joint housing from which it is separated by means of a gasket 13. The housing 10 may be secured to the universal joint housing in any suitable manner, but for the purpose of illustration, we have shown the following means for this purpose:—The universal joint housing has lugs 14 extending outwardly from opposite sides thereof, which are perforated for the reception of the rear radius rods 15. The housing 10 is provided with downwardly projecting perforated lugs 16, through which the threaded ends of the rods 15 extend and which are clamped against the lugs 14 by means of nuts 17. The housing 3 and bearing 4 are provided with an opening 18 through which grease may be forced into the bearing. The housing 10 has a chamber 19 in communication with the opening 18. A grease cup 20 is in communication with the chamber 19. Grease from the cup 20 is forced into the chamber 19 and from thence into the bearing. The end of shaft 12 is provided with a diametrical slot 21 and projects a short distance beyond the threaded nipple 22. An ordinary flexible shaft 23 is connected to the shaft 12 and to the nipple 22 by means of the connector 24. This shaft extends to the speedometer and transmits motion to it in the usual way.

Figure 4:
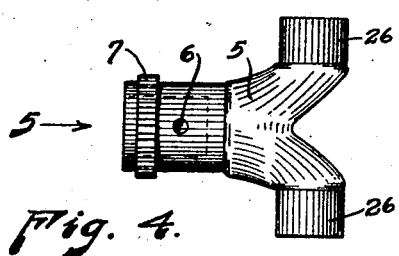
Fig. 4 is a plan view of my improved joint knuckle.
Figure 3:
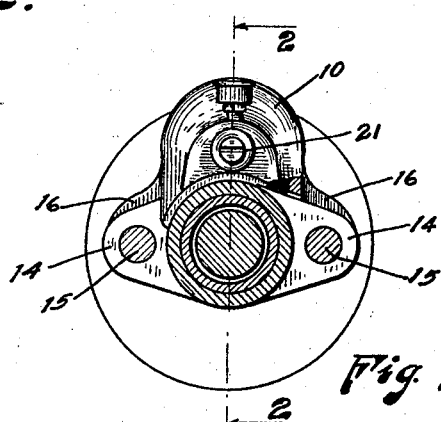
Fig. 3 is a section taken on line 3—3, Fig. 2.
Figure 5:
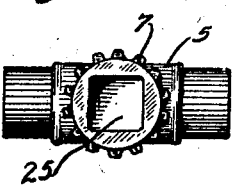
Fig. 5 is an end elevation looking in the direction of arrow 5 in Fig. 4.

We want to call particular attention to the construction of the joint knuckle 5 which makes it possible to obtain the power for driving the speedometer at this point. The member 5 has one end provided with a rectangular opening 25 for the reception of the end of the shaft 1. The other end is provided with outwardly projecting lugs 26 and a gear 7 is formed integral therewith in the manner shown in Figs. 4 and 5.

It is apparent from the above description, that we have invented a combination of elements, by means of which it is possible to obtain power for the operation of the speedometer from the universal joint. This eliminates the unsightly and unsatisfactory connection with the front wheel and permits the gears to run in grease, or to be properly lubricated at all times.

Having now described our invention, what we claim as new is:

A device for connecting a flexible speedometer shaft to a movable portion of an automobile comprising a housing having two chambers of different sizes separated by a partition, a shaft extending through the smaller chamber through the partition and into the larger chamber, a grease cup secured to the housing and communicating with the smaller chamber, a gear secured to the shaft and located within the larger chamber, and two perforated lugs projecting downwardly from the housing, said lugs being located in a plane parallel to the plane of the gear and perforated for the reception of bolts.

In testimony whereof we affix our signatures.

FRANK OLSON,
HAROLD BREWER.